(12) United States Patent
Chen et al.

(10) Patent No.: US 11,644,479 B2
(45) Date of Patent: May 9, 2023

(54) QUANTUM-DOT-BASED MEASURING SYSTEM AND METHOD

(71) Applicant: SHANGHAI UNIVERSITY, Shanghai (CN)

(72) Inventors: Na Chen, Shanghai (CN); Shaoying Li, Shanghai (CN); Tingyun Wang, Shanghai (CN); Zhenyi Chen, Shanghai (CN); Shupeng Liu, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 38 days.

(21) Appl. No.: 17/340,129

(22) Filed: Jun. 7, 2021

(65) Prior Publication Data

US 2021/0382086 A1 Dec. 9, 2021

(30) Foreign Application Priority Data

Jun. 5, 2020 (CN) .......................... 202010505914.9

(51) Int. Cl.
*G01Q 60/22* (2010.01)
*G01Q 60/58* (2010.01)
*G01Q 60/20* (2010.01)
*G01Q 60/18* (2010.01)

(52) U.S. Cl.
CPC ............. *G01Q 60/22* (2013.01); *G01Q 60/18* (2013.01); *G01Q 60/20* (2013.01); *G01Q 60/58* (2013.01)

(58) Field of Classification Search
CPC .................................................... G01Q 60/18
See application file for complete search history.

(56) References Cited

U.S. PATENT DOCUMENTS

2010/0306888 A1* 12/2010 Tischler ................ B82Y 20/00
850/30

FOREIGN PATENT DOCUMENTS

CN 110568224 A 12/2019
CN 110426535 B 1/2021

OTHER PUBLICATIONS

Shubeita et al., 'Scanning near-field optical microscopy using semiconductor nanocrystals as a local fluorescence and fluorescence resonance energy transfer source' 2003, Journal of Microscopy, vol. 210, Pt 3 pp. 274-278 (Year: 2003).*
Fujii et al., 'A Fusion-Spliced Near-Field Optical Fiber Probe Using Photonic Crystal Fiber for Nanoscale Thermometry Based on Fluorescence-Lifetime Measurement of Quantum Dots' 2011 Sensors vol. 11 pp. 8358-8369 (Year: 2011).*

(Continued)

*Primary Examiner* — Eliza W Osenbaugh-Stewart
(74) *Attorney, Agent, or Firm* — Kilpatrick Townsend & Stockton, LLP

(57) ABSTRACT

A quantum-dot-based measuring system is disclosed. The quantum-dot-based measuring system includes a laser to emit excitation light, an optical fiber probe including a tail end and a tapered tip, and the tapered tip of the optical fiber probe is attached with one or more quantum dots, and the excitation light is injected from the tail end of the optical fiber probe and emitted from the tapered tip to a sample to be detected, an objective lens to collect optical signal reflected by the sample and a spectrometer to receive the optical signal.

13 Claims, 2 Drawing Sheets

(56) References Cited

OTHER PUBLICATIONS

Figure 1:
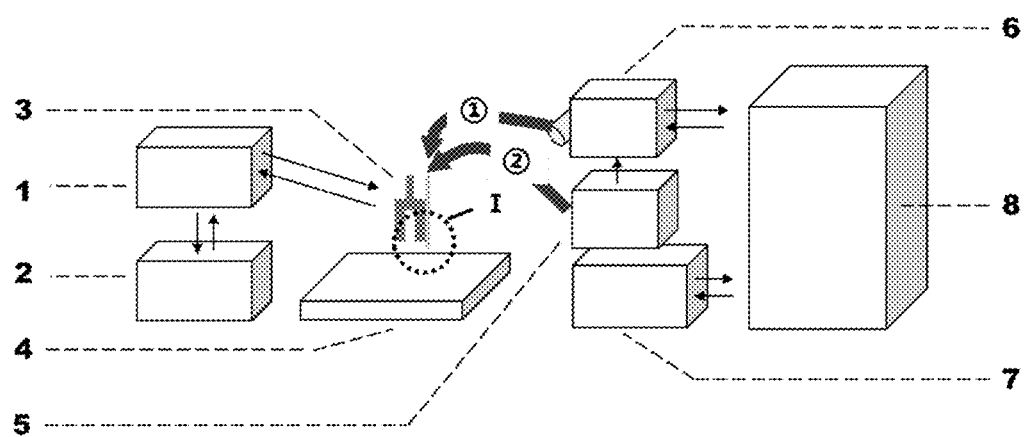

Sasagawa et al., 'Effects of optical polarization in reflection-mode near-field optical microscopy' 2001 Technical Digest. CLEO/Pacific Rim 2001. 4th Pacific Rim Conference on Lasers and Electro-Optics (Cat. No. 01TH8557), 2001, pp. II-II (Year: 2001).*
Office Action of CN Patent Application No. 202010505914.9 dated May 7, 2022.
Geng Youfu et al, "Research on Temperature Sensors Based on Microstructured Fiber", Journal of Applied Sciences—Electronics and Information Engineering, Mar. 2020 DOI: 10 3969/j.issn.0255-8297.2020.02.004.

* cited by examiner

QUANTUM-DOT-BASED MEASURING SYSTEM AND METHOD

CROSS-REFERENCE TO RELATED APPLICATIONS

This patent application claims the benefit of CN Appl. No. 202010505914.9 filed Jun. 5, 2020. The above application is incorporated by reference herein.

FIELD OF THE DISCLOSURE

The disclosure relates to the field of micro-nano area temperature measurement, and particularly relates to a measuring system and method using an optical fiber probe.

BACKGROUND

With the gradual miniaturization of key materials in various fields, people are interested in nano-scale thermal characterization methods, and high-resolution temperature measurement technology has become a research hotspot in related fields. At present, the more common temperature measurement techniques include thermocouple probe temperature measurement, scanning thermal field microscopy temperature measurement, optical temperature measurement and so on. The loop in the thermocouple probe is composed of two different conductors or semiconductors. When the temperature of the two junctions changes, a temperature-related electromotive force will be generated. However, limited by the technical level, the spatial resolution of thermocouples is relatively low, and can only perform single-point temperature measurement but cannot analyze the temperature distribution of the measurement area. The scanning thermal field microscope (SThM) based on the atomic force microscope (AFM) makes the temperature measuring probe as close to the sample as possible, and measures the temperature of the surface of sample through the heat exchange between the sample and the tip. However, the limitation of this method is that the metal temperature measuring probe used has conductive characteristics, which is not suitable for the temperature measurement environment of electronic devices.

Compared with other temperature measurement technologies, optical temperature measurement technology has significant advantages such as less interference, faster response, and be able to perform non-destructive detection. Currently, fluorescence spectral analysis, Raman scattering spectral analysis and photocurrent spectral analysis technique have been successively applied to the material, electronics, biology and other fields of heat science research, which can reach up to 1 μm spatial resolution. However, traditional optical devices are limited by the diffraction limit, and can only obtain a micron-scale spatial resolution but cannot achieve nano-scale optical characterization under conventional conditions.

Scanning near-field optical technology breaks through the limitation of diffraction limit and provides a new and reliable method for nano-scale research. Scanning near-field optical microscopy (SNOM) studies the interaction of non-propagating non-uniform field and its materials at the nanometer scale. SNOM can be classified into aperture-SNOM and scattering-SNOM and so on, according to the structure of probe. The aperture optical fiber probe is the most common probe. The optical fiber is adhered to the crystal oscillating sensor, and the distance from the optical fiber to the sample to be tested is controlled by the piezoelectric sensor to be less than half the wavelength of light, and obtaining distribution information of sub-wavelength scale light field. On this basis, if the fiber is modified to form a functional fiber probe, non-optical information can be obtained. Quantum dots have the characteristics of long fluorescence lifetime, good biocompatibility, and luminescence properties which are very sensitive to the surrounding environment. Quantum dot is a good tool for measuring light, electricity, magnetism, heat and other physical fields at the micro-nano scale. If the temperature-sensitive quantum dots are coupled to the near-field aperture probe, the sample surface morphology image, near-field optical image, and temperature distribution image can be obtained at the same time.

Chinese Patent CN201910544844.5 discloses a near-field optical microprobe based on a single quantum dot scanning and its system, detecting apparatus and method. This patent uses a single quantum dot to modify the tip, and the analysis region is only a single quantum dot size area of the tip. This patent analyzes only the surface morphology of the sample, and does not analyze from other points of view. This patent's excitation method for tip quantum dots is that the laser is directly irradiated from the objective lens to the sample surface, and due to the large light spot, the excitation power at the tip is weak. In this patent, since it takes an scan time to measure an object, during this time, the fluorescent signal will continue to be affected by external interference and change.

SUMMARY

In view of the shortcomings of the existing temperature measurement technology, the present disclosure provides a measuring system and method based on quantum dots.

According to one embodiment of the present disclosure, a quantum-dot-based measuring system includes a laser, an optical fiber probe, an objective lens and a spectrometer. The laser is to emit excitation light. The optical fiber probe includes a tail end and a tapered tip, and the tapered tip of the optical fiber probe is attached with one or more quantum dots, and the excitation light is injected from the tail end of the optical fiber probe and emitted from the tapered tip to a sample to be detected. The objective lens is to collect optical signal reflected by the sample. And the spectrometer is to receive the optical signal.

According to another embodiment of the present disclosure, a quantum-dot-based measuring method includes emitting excitation light from a laser; injecting the excitation light through an optical fiber probe to a sample to be detected, and the optical fiber probe includes a tail end and a tapered tip, and the tapered tip of the optical fiber probe is attached with one or more quantum dots, and the excitation light is injected from the tail end of the optical fiber probe and emitted from the tapered tip; collecting optical signal reflected by the sample at an objective lens; and receiving the optical signal at a spectrometer.

BRIEF DESCRIPTION OF THE DRAWING(S)

Figure 2:
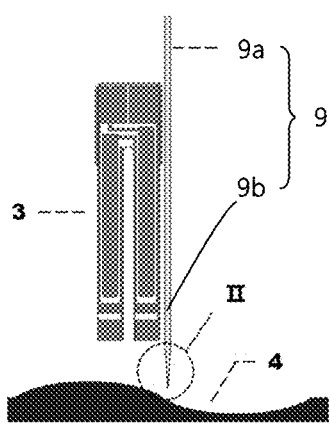
Figure 3:
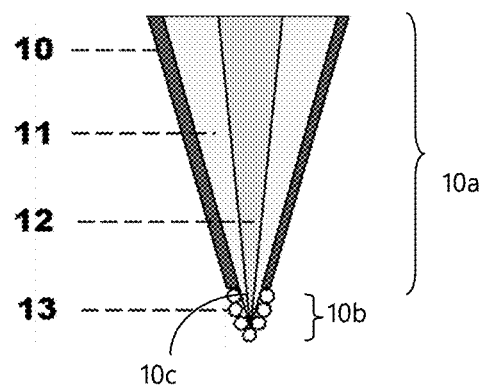
Figure 4:
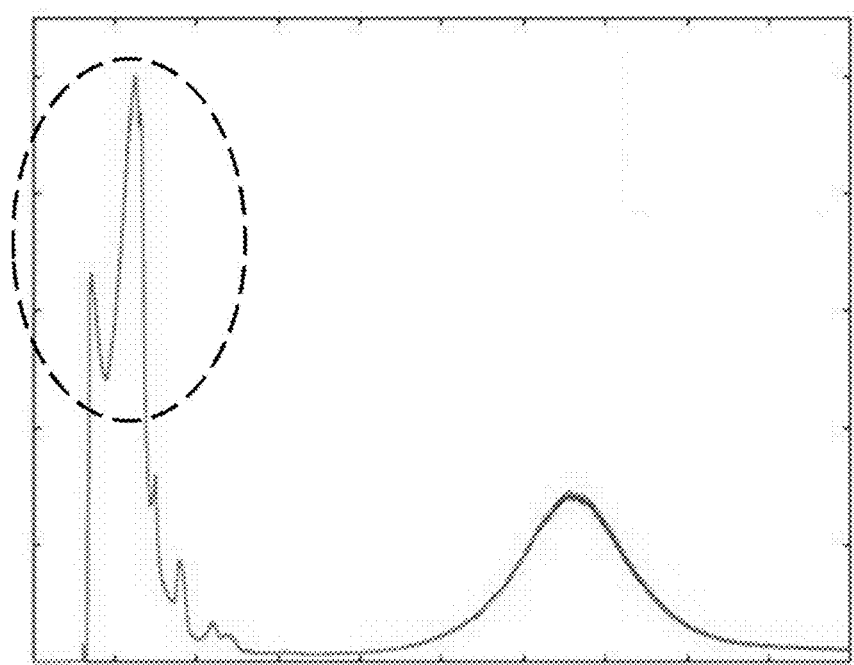

FIG. 1 is a schematic diagram of a system of an embodiment of the present disclosure;
FIG. 2 is an enlarged view of the position I in FIG. 1;
FIG. 3 is an enlarged view at the position II in FIG. 2;
FIG. 4 is a fluorescence spectrum chart containing temperature information.
In the figures:
1 signal preamplifier
2 scanning feedback system 3 tuning fork
4 sample stage
5 laser
6 objective lens
7 CCD
8 spectrometer
9 optical fiber probe
9a tail end
9b tapered tip
10 aluminum coating
10a cone area
10b uncoated area
10c nano-scale aperture
11 fiber cladding
12 fiber core
13 quantum dot

DETAILED DESCRIPTION

The embodiments of the present disclosure will be described in further detail below, but the protection scope of the present disclosure is not limited to the content.

Embodiments of the present disclosure disclose a near-field temperature measuring probe, a near-field temperature measuring system and method based on quantum dots. This near-field temperature measuring probe can make up for the existing defects of low resolution and large external interference, and realizes high-resolution temperature detection. At the same time, using this system and method can realize the local temperature distribution imaging of the micro-nano area of the sample, and also can obtain the surface topography of the sample and the near-field optical image.

As shown in FIGS. 1-3, the near-field temperature measuring system based on quantum dots includes a signal preamplifier 1, a scanning feedback system 2, a tuning fork 3, a sample stage 4, a laser 5, an objective lens 6, a photoelectric detector such as CCD 7, a spectrometer 8 and an optical fiber probe 9.

In an embodiment, the tuning fork 3 is a quartz tuning fork.

In an embodiment, the CCD 7 is a part of the spectrometer 8.

The optical fiber probe 9 is fixed to the tuning fork 3. The tuning fork 3 is installed on the spatial displacement device and connected to the signal preamplifier 1. The signal preamplifier 1 is connected to the scanning feedback system 2. And the morphological information of the sample can be obtained according to the feedback force generated by the tuning fork 3 on the sample surface. The optical fiber probe 9 is drawn by a micropipette puller, and parameters such as a cone angle, a length of the cone area and a tip diameter are all controllable. The optical fiber probe 9 includes a tail end 9a and a tapered tip 9b. The optical fiber probe 9 also includes a fiber cladding 11 and a fiber core 12. The tapered tip 9b includes a cone area 10a which is coated, for example, with aluminum coating 10. The tapered tip 9b further includes an uncoated area 10b which includes a nano-scale aperture 10c. The coated cone area 10a ensures that light emitting area is the nano-scale aperture 10c of the tapered tip 9b and the nanometer-level spatial resolution. Furthermore, the tapered tip 9b is attached with one or more quantum dots 13. The quantum dots 13 have temperature-sensitive properties to ensure high temperature sensitivity. The excitation light emitted by the laser 5 enters from the tail end 9a of the optical fiber probe 9, where two optical paths are set; the excitation light in the optical path ① is spatially coupled to the objective lens 6 and then enters the tail end 9a of the optical fiber probe 9, while the optical signal after the sample is excited enters the optical fiber from the tapered tip 9b of the optical fiber probe 9, and then enters the spectrometer through the objective lens 6 from the tail end 9a, and in the optical path ②, the laser 5 is directly connected to the tail end 9a of the optical fiber probe 9, and the optical signal after the sample is excited does not pass through the optical fiber probe 9 but is directly collected by the objective lens 6.

It can be understood that the sample is exited means the quantum dots 13 approaching or contacting the sample are exited. In one embodiment, the quantum dots 13 fluoresces when exited by the excitation light. This fluorescence signal varies with the temperature of the quantum dots 13. When the optical fiber probe 9 approaches or contact the sample, heat is transferred from the sample to the quantum dots 13 at the tapered tip 9b of the optical fiber probe 9, causing changes in the temperature of the quantum dots, which in turn causes change of the fluorescence signal. Therefore, the temperature of the sample can be deduced by observing the change the fluorescence signal.

FIG. 1 shows a novel near-field temperature measurement system based on quantum dots. This system can measure three different kinds of data in the same area of the sample, and some changes to the connection of the system are required during the measurement process. The optical path ① in the figure is used for temperature distribution imaging. In this first working mode, the excitation light of the laser 5 is spatially coupled to the objective lens 6, the tail end 9a of the optical fiber probe 9 is focused under the objective lens 6, and the excitation light reaches the tapered tip 9b through the optical fiber probe to excite the sample, and the obtained optical signal passes through this optical fiber probe and enters the spectrometer through the objective lens. The optical path ② in the figure is used for near-field optical imaging. In this second working mode, the tail end of the optical fiber probe is directly connected to the laser, and the excitation light reaches the sample surface for excitation, and the obtained optical signal is collected by the objective lens and enters the spectrometer. In an embodiment, the first and second working mode proceed at the same time. In this embodiment, the system has two objective lens, one for the optical path ① and the other for the optical path ②. In another embodiment, both imaging processes can obtain sample morphology information at the same time with the first and/or second working mode.

FIG. 3 shows the distribution of quantum dots 13 at the tapered tip of the tapered optical fiber probe. The tapered optical fiber probe 9 coupled with the quantum dots 13 used in the system is vertically fixed on the outer arm of the tuning fork 3. The signal generated by the tuning fork 3 under the action of the transverse shear force is transmitted to the preamplifier 1 via the circuit board and enters the scanning feedback system 2, and real-time control of the distance between the probe and the sample is realized during the probe scanning process, and a signal containing sample information in an area is obtained.

The optical signal system can acquire two kinds of signal imaging, so there are two different kinds of modes. In the working mode of near-field optical imaging, the tail end 9a of the tapered optical fiber probe 9 is connected to the laser 5, which transmits the excitation optical signal to the cone area of the tapered tip 9b for sample detection; the optical signal reflected back from the sample surface is acquired by the objective lens 6 and then enters the spectrometer 8; after that, the CCD 7 converts the signal acquired by the spectrometer 8 into an electrical signal that can be processed by a computer. In the working mode of temperature distribution imaging, the tail end 9a of the tapered optical fiber probe 9 is connected to the objective lens 6, and the excitation light is coupled from the laser 5 through the spectrometer 8 into the optical fiber 9; the light reflected from the surface of the sample and the fluorescence in the cone area of the tapered tip 9b returns from the optical fiber 9 to the spectrometer 8; and then are converted into electrical signals by CCD7.

FIG. 4 shows the fluorescence spectrum comprising temperature information, and the circled part in the figure is the Raman signal. In the process of scanning the sample, the optical fiber transmitting optical signals is excited by the excitation light, the Raman signal is generated at several fixed peak positions, and the signal strength gradually increases as the length of the optical fiber increases. After determining the length of the optical fiber used in the experiment, the intensity and peak position of the Raman signal generated by the optical fiber remain constant and can be used as an internal standard to correct the fluorescent signal affected by factors such as environment and improve accuracy. The fluorescent signal is from the quantum dots after excited by the excitation light. According to an embodiment, a computer (not shown) coupled to the spectrometer 8 uses the Raman signal correct the fluorescent signal.

From another perspective, an embodiment of the present disclosure provides quantum-dot-based measuring method comprising the following step. First, emits excitation light at the laser 5. Then injects the excitation light through the optical fiber probe 9 to a sample to be detected. The optical fiber probe includes a tail end 9a and a tapered tip 9b, and the tapered tip 9b is attached with one or more quantum dots 13. The excitation light from laser 5 is injected from the tail end 9a and emitted from the tapered tip 9b. Then collects optical signal reflected by the sample at the objective lens 6. At last, receiving the optical signal at the spectrometer 8.

According to an embodiment, the method includes a process for temperature distribution imaging. During this process, the above step of injecting includes spatially coupling the excitation light of the laser 5 to the objective lens 6, focusing the tail end 9a under the objective lens 6 so that the excitation light passes through the optical fiber probe to the tapered tip 9b and excites the sample. In the other hand, the above step of collecting includes collecting an obtained optical signal at the optical fiber probe 9 again, then the optical signal enters the spectrometer 8 from the tail end 9a and through the objective lens 6.

According to an embodiment, the method includes a process for near-field optical imaging. During this process, the above step of injecting includes directly connecting the tail end 9a to the laser 5 so that the excitation light passes through the optical fiber probe 9 and excites on surface of the sample. In the other hand, the step of collecting includes collecting the optical signal directly at the objective lens 6.

According to an embodiment, the method further includes a process for surface topography of the sample. This process includes fixing the optical fiber probe 9 on the tuning fork 3, keeping the tapered tip 9b of the optical fiber probe approaching the sample stage 4 until contacting the sample, generating feedback signal under action of shear force at the tuning fork 3; transmitting the feedback signal to the scanning feedback system 2; and obtaining the surface topography of the sample according to the feedback signal at the scanning feedback system 2.

According to an embodiment, the method further includes controlling the distance between the optical fiber probe 9 and the sample based on the feedback signal from the tuning fork 3 at the scanning feedback system 2. The scanning feedback system 2 controls the distance through a shear-force-distance-feedback mode. The tuning fork 3 is always upright during the process for surface topography.

According to an embodiment, the method further includes using a Raman signal accumulated by the optical fiber probe itself as an internal standard to correct a fluorescence signal containing temperature information from the sample.

Test Case 1:

The sample is a polished monocrystalline silicon wafer embedded with a gold wire, and leads of the gold wire are connected to ends of the 5V power supply respectively. Due to the relatively high resistivity of the gold, a heat field is formed around the gold wire. The selected scanning area under the microscope contains the gold wire, and the position of the gold wire is perpendicular to the scanning direction. The sample stage 4 keeps approaching the probe until the probe reaches the surface of the silicon wafer, the feedback system receives a signal, and the sample stage 4 stops moving. The tail end 9a of the tapered optical fiber probe 9 is connected to the objective lens, the laser 5 is turned on, and the optical fiber transmits the excitation light coupled from the objective lens, the light reflected from the surface of the silicon wafer and the fluorescence of the quantum dot 13. During the detection process, the sample stage 4 moves horizontally to realize point-by-point detection of the sample, and the distance between the sample and the probe is controlled by the feedback system. In this way, the surface topography image and the temperature distribution image can be obtained at the same time, the height of the area where the gold wire is located is higher than other areas of the silicon wafer, and the temperature at the position of gold wire is higher than the surrounding temperature. Under the condition that the scanning area remains unchanged, the tail end 9a of the tapered optical fiber probe 9 is connected to the laser 5, the excitation light is transmitted to the tapered tip 9b of the probe 9, the optical signal reflected on the surface of the silicon wafer is captured by the objective lens 6 and enters the spectrometer 8. Finally, a near-field optical image of the same area can be obtained. In an embodiment, this near-field optical image is obtained at the same time with the surface topography image and the temperature distribution image.

Test Case 2:

The sample is an unpackaged integrated circuit chip, and there are the external power supply and peripheral circuits of the chip to ensure that the chip works normally. The PN junction is selected as the scanning area. When the chip is in working condition, the PN junction temperature is higher than the surrounding temperature. Select the PN junction area under the microscope and make the whole chip in working condition. The sample stage 4 keeps approaching the probe until the probe reaches the surface of the chip, the feedback system receives a signal, and the sample stage 4 stops moving. The tail end 9a of the tapered optical fiber probe 9 is connected to the objective lens, the laser 5 is turned on, and the optical fiber transmits the excitation light coupled from the objective lens, the light reflected from the chip surface and the fluorescence of the quantum dot 13. During the detection process, the sample stage 4 moves horizontally to realize point-by-point detection of the chip, and the distance between the chip and the probe is controlled by the feedback system. In this way, the surface topography image and the temperature distribution image can be obtained at the same time. There is a regular circuit distribution on the chip surface, while the temperature at the PN junction is higher than the surrounding temperature. Under the condition that the scanning area remains unchanged, the tail end 9a of the tapered optical fiber probe 9 is connected to the laser 5, the signal of the excitation light is transmitted to the tapered tip 9b of the cone position, and the optical signal reflected on the surface of the silicon wafer is captured by the objective lens 6 and enters the spectrometer 8. Finally, a near-field optical image of the same area can be obtained. In an embodiment, this near-field optical image is obtained at the same time with the surface topography image and the temperature distribution image.

Some of the embodiments of the present disclosure compared with the prior art are:

(1) The present disclosure can obtain three type of results including temperature distribution image, surface topography image, and near-field optical image in the same area of the sample, which is beneficial for comprehensive analysis of the sample from multiple angles.

(2) The excitation light and the collected fluorescence of the present disclosure are transmitted through an optical fiber, and the Raman peak accumulated by the optical fiber itself is used as an internal standard to correct the fluorescence signal containing sample information.

(3) The present disclosure is based on near-field optics, breaks through the diffraction limit of traditional optics, and can achieve spatial resolution that cannot be achieved by thermocouples or traditional optical detection methods. In addition, there will be no additional signal interference during detection.

(4) The present disclosure can obtain a local temperature distribution, and is not limited to single-point detection.

(5) The detection method of the present disclosure will not change the nature of the sample, nor will it cause damage to the sample.

What is claimed is:

1. A quantum-dot-based measuring system comprising,
a laser to emit excitation light;
an optical fiber probe including a tail end and a tapered tip, wherein the tapered tip of the optical fiber probe is attached with one or more quantum dots, and wherein the excitation light is injected from the tail end of the optical fiber probe and emitted from the tapered tip to a sample to be detected,
an objective lens to collect optical signal reflected by the sample; and
a spectrometer to receive the optical signal,
wherein the system comprises a first working mode for temperature distribution imaging in which the excitation light of the laser is spatially coupled to the objective lens, the tail end of the optical fiber probe is focused under the objective lens, the excitation light passes through the optical fiber probe to the tapered tip and excites the sample, and an obtained optical signal is collected by the optical fiber probe again and enters the spectrometer from the tail end of the optical fiber through the objective lens.

2. The quantum-dot-based measuring system according to claim 1, wherein the tapered tip of the optical fiber probe includes a coated cone area and an uncoated area of attached with one or more quantum dots, and wherein the uncoated area includes a nano-scale aperture for light emitting.

3. The quantum-dot-based measuring system according to claim 1, further comprising a tuning fork, a signal preamplifier, a scanning feedback system and a photoelectric detector, wherein the optical fiber probe is fixed on the tuning fork, the tuning fork is connected to the signal preamplifier and the scanning feedback system, and the objective lens is connected to the photoelectric detector.

4. The quantum-dot-based measuring system according to claim 3, comprising a third working mode for surface topography of the sample in which the tapered tip of the optical fiber probe fixed on the tuning fork keeps approaching a sample stage for bearing the sample until contacting the sample, the signal preamplifier and the scanning feedback system obtains the surface topography of the sample according to shear force of feedback.

5. The quantum-dot-based measuring system according to claim 4, wherein the scanning feedback system is configured to control a distance between the optical fiber probe and the sample based on a signal from the tuning fork through a shear-force-distance-feedback mode, and the tuning fork is always upright during a process of measuring process.

6. The quantum-dot-based measuring system according to claim 1, comprising a second working mode for near-field optical imaging in which the tail end of the optical fiber probe is directly connected to the laser, the excitation light passes through the optical fiber probe and excites on surface of the sample, and an obtained optical signal is collected by the objective lens and enters the spectrometer.

7. The quantum-dot-measuring system according to claim 1, wherein a Raman signal accumulated by the optical fiber probe itself is used as an internal standard to correct a fluorescence signal containing temperature information from the sample.

8. The quantum-dot-based measuring system according to claim 1, wherein one or more quantum dots has temperature-sensitive properties which ensure high temperature sensitivity.

9. A quantum-dot-based measuring method comprising,
emitting excitation light from a laser;
injecting the excitation light through an optical fiber probe to a sample to be detected, wherein the optical fiber probe includes a tail end and a tapered tip, and the tapered tip of the optical fiber probe is attached with one or more quantum dots, and wherein the excitation light is injected from the tail end of the optical fiber probe and emitted from the tapered tip;
collecting optical signal reflected by the sample at an objective lens; and
receiving the optical signal at a spectrometer,
wherein the method comprises a process for temperature distribution imaging during which the step of injecting comprises spatially coupling the excitation light of the laser to the objective lens, focusing the tail end of the optical fiber probe under the objective lens so that the excitation light passes through the optical fiber probe to the tapered tip and excites the sample, and the step of collecting comprises collecting an obtained optical signal at the optical fiber probe again, wherein the optical signal enters the spectrometer from the tail end of the optical fiber through the objective lens.

10. The quantum-dot-based measuring method according to claim 9, comprising a process for near-field optical imaging during which
the step of injecting comprises directly connecting the tail end of the optical fiber probe to the laser so that the excitation light passes through the optical fiber probe and excites on surface of the sample, and
the step of collecting comprises collecting the optical signal directly at the objective lens.

11. The quantum-dot-based measuring method according to claim 9, further comprising a process for surface topography of the sample including
fixing the optical fiber probe on a tuning fork;

keeping the tapered tip of the optical fiber probe approaching a sample stage for bearing the sample until contacting the sample;

generating feedback signal under action of shear force at the tuning fork;

transmitting the feedback signal to a scanning feedback system; and obtaining the surface topography of the sample according to the feedback signal at the scanning feedback system.

12. The quantum-dot-based measuring method according to claim 11, further comprising controlling a distance between the optical fiber probe and the sample based on the feedback signal from the tuning fork through a shear-force-distance-feedback mode at the scanning feedback system, wherein the tuning fork is always upright during the process for surface topography.

13. The quantum-dot-based measuring method according to claim 9, further comprising using a Raman signal accumulated by the optical fiber probe itself as an internal standard to correct a fluorescence signal containing temperature information from the sample.

\* \* \* \* \*